US008693765B2

(12) United States Patent
Mercier et al.

(10) Patent No.: US 8,693,765 B2
(45) Date of Patent: Apr. 8, 2014

(54) METHOD FOR RECOGNIZING SHAPES AND SYSTEM IMPLEMENTING SAID METHOD

(75) Inventors: David Mercier, Dourdan (FR); Anthony Larue, Chaville (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 281 days.

(21) Appl. No.: 13/062,220

(22) PCT Filed: Aug. 13, 2009

(86) PCT No.: PCT/EP2009/060477
§ 371 (c)(1),
(2), (4) Date: Apr. 12, 2011

(87) PCT Pub. No.: WO2010/026028
PCT Pub. Date: Mar. 11, 2010

(65) Prior Publication Data
US 2011/0182501 A1    Jul. 28, 2011

(30) Foreign Application Priority Data

Sep. 5, 2008 (FR) ...................................... 08 04880

(51) Int. Cl.
*G06K 9/62* (2006.01)
(52) U.S. Cl.
USPC ........... 382/159; 382/155; 382/156; 382/157; 382/158; 382/160
(58) Field of Classification Search
USPC .................................. 382/155–161, 276–281
See application file for complete search history.

(56) References Cited

U.S. PATENT DOCUMENTS 6,317,517 B1 * 11/2001 Lu .................................. 382/228
7,180,441 B2 * 2/2007 Rowe et al. ..................... 342/22

FOREIGN PATENT DOCUMENTS

WO    2006/106508 A2    10/2006

OTHER PUBLICATIONS

Liu et al: "Gabor feature based classification using the enhanced fisher linear discriminant model for face recognition", IP-IEEE, 2002.*
Lewicki et al: "Probabilistic framework for the adaptation and comparison of image codes", J. Opt. Soc., 1999.*
Hamamoto et al: "A Gabor filter-based method for recognizing handwritten numerals", Pattern Recognition, 1998.*
Ralph Neff et al.: "Matching Pursuit Video Coding-Part I: Dictionary Approximation," IEEE Transactions on Circuits and Systems for Video Technology, IEEE Service Center, Piscataway, NJ, US, vol. 12, No. 1, Jan. 1, 2002.

(Continued)

*Primary Examiner* — Ruiping Li
(74) *Attorney, Agent, or Firm* — Baker Hostetler LLP

(57) ABSTRACT

The invention includes a method for recognizing shapes using a preprocessing mechanism that decomposes a source signal into basic components called atoms and a recognition mechanism that is based on the result of the decomposition performed by the preprocessing mechanism. In the method, the preprocessing mechanism includes at least one learning phase culminating in a set of signals called kernels, the kernels being adapted to minimize a cost function representing the capacity of the kernels to correctly reconstruct the signals from the database while guaranteeing a sparse decomposition of the source signal while using a database of signals representative of the source to be processed and a coding phase for decomposing the source signal into atoms, the atoms being generated by shifting of the kernels according to their index, each of the atoms being associated with a decomposition coefficient. The invention also includes a shape recognition system for implementing the method.

13 Claims, 3 Drawing Sheets

(56) References Cited

OTHER PUBLICATIONS

Ho Y C et al.: "Simple Explanation of the No-Free-Lunch Theorem and Its Implications," Journal of Optimization Theory and Applications, Plenum Press, London, GB, vol. 115, No. 3, Dec. 1, 2002, pp. 549-570.

Chung-Lin Huang et al.: "Road sign interpretation using matching pursuit method," Pattern Recognition, 2000. Proceedings. 15th International Conference on Sep. 3-7, 2000; [Proceedings of the International Conference on Pattern Recognition. (ICPR)], Los Alamitos, CA, USA, IEEE Comput. Soc, US, vol. 1, Sep. 3, 2000, pp. 329-333.

Mendels F et al.: "Rotation and scale invariant shape representation and recognition using matching pursuit," Pattern Recognition, 2002. Proceedings. 16th International Conference on Quebec City, Que., Canada Aug. 11-15, 2002, Los Alamitos, CA, USA, IEEE Comput. Soc. US, vol. 4, Aug. 11, 2002, pp. 326-329.

Vandergheynst P et al.: "Efficient image representation by anisotropic refinement in matching pursuit," 2001 IEEE International Conference on Acoustics, Speech, and Signal Processing. Proceedings. (ICASSP). Salt Lake City, UT, May 7-11, 2001; [IEEE International Conference on Acoustics, Speech, and Signal Processing (ICASSP)], New York, NY: IEEE, US, vol. 3, May 7, 2001, pp. 1757-1760.

Smith E et al.: "Efficient coding of time-relative structure using spikes," Neural Computation, Massachusetts Institute of Technology, US, vol. 17, No. 1,, Jan. 1, 2005, pp. 19-45.

Smith E et al.: "Efficient auditory coding," Nature, vol. 439, No. 23, pp. 978-985, Feb. 23, 2006.

Pati Y.C. et al.: "Orthogonal Matching Pursuit: Recursive Function Approximation with Applications to Wavelet Decomposition," Proceedings of the 27th Annual Asilomar Conference on Signals, Systems, and Computers, Nov. 1-3, 1993.

\* cited by examiner

METHOD FOR RECOGNIZING SHAPES AND SYSTEM IMPLEMENTING SAID METHOD

CROSS-REFERENCE TO RELATED APPLICATIONS

This application is a National Stage of International patent application PCT/EP2009/060477, filed on Aug. 13, 2009, which claims priority to foreign French patent application No. FR 08 04880, filed on Sep. 5, 2008, the disclosures of which are incorporated by reference in their entirety.

FIELD OF THE INVENTION

The invention relates to a method for recognizing shapes and a system implementing the method. It applies notably to the fields of the recognition of seismic and biomedical signals, and the recognition of movements or gestures, for example the recognition of handwriting.

BACKGROUND OF THE INVENTION

A shape recognition system conventionally comprises two main processing modules. The nature of the inputs for the system may vary widely: data represented in the form of vectors, time signals, images, videos. There may be data obtained directly from sensors or that has already undergone processing operations, such as a filtering or a merging of data for example.

The first module performs a preprocessing and codes the inputs of the system. The desired aim is to present the information contained in the inputs as explicitly as possible. The second processing module performs the actual recognition by using the code generated by the first module. This operation, also called discrimination, is made easier when the preprocessing is effective, that is to say that the coding performed is as informative as possible. The choice of preprocessing method is therefore key in optimizing a recognition system.

The preprocessing methods usually used in such a system depend on the type of input to be processed.

In the case of recognition systems that process data, the input of the preprocessing module consists of a vector. This vector can be linearly decomposed into a series of components. For a given vector s, by having a base of N components $\psi_j$ of the same dimension as s, the linear decomposition leads to the decomposition equation expressed below:

$$s = \sum_{i=1}^{N} \beta_j \Psi_j \quad (1)$$

The variables $\beta_j$ are associated with the components $\psi_j$ and are the result of the decomposition. The components $\psi_j$ are usually orthonormal, which considerably simplifies the calculation of the variables $\beta_j$ by restricting it to a scalar product. It is also usual for the base not to generate all the space. Such is the case if N is less than the dimension of the data. In this case, a reconstruction error e is added to the equation (1):

$$s = \sum_{i=1}^{N} \beta_j \Psi_j + e \quad (2)$$

The conventional methods for decomposing data such as, for example, principal component analysis (PCA), independent component analysis (ICA) or linear discriminative analysis (LDA), determine the components $\psi_j$ to be used by learning by using databases of input vectors. A drawback to these methods limiting their effectiveness is that they have no physical meaning specific to the phenomenon being processed.

In the case of recognition systems that process signals, the source signal s(t) to be processed can be expressed as a linear combination of atoms. If the sampled signal to be processed s(t) is one-dimensional and of length T, it is decomposed by using a base consisting of N atoms $\psi_j(t)$ of length T. The signal can then be expressed:

$$s(t) = \sum_{i=1}^{N} \beta_j \psi_j(t) \quad (3)$$

The result of the decomposition is the value of all the variables $\beta_j$ associated with the atoms $\psi_j(t)$.

This notation is extended to the decomposition of multidimensional signals. The signal s(t) is then expressed as a linear combination of atoms $\psi_j(t)$ of the same dimensions as s(t). Just the same as for the vectors, the atoms may not generate all the space and a reconstruction error e(t) is taken into account giving:

$$s(t) = \sum_{i=1}^{N} \beta_j \Psi_j(t) + e(t) \quad (4)$$

By taking the example of a decomposition by Fourier transform, the atoms are complex exponential functions or else sine and cosine functions. An atom then corresponds to a pure single-frequency signal and these functions are indexed by frequency.

The decomposition base may also be generated from shorter signals, called kernels, which are made to undergo various transformations to generate all the atoms. This principle is used, for example, by wavelet transform: the atoms are constructed from a single kernel called mother wavelet. This kernel undergoes, on the one hand, a change of scale and, on the other hand, a time shift. These operations conducted on the same kernel lead to a base of several atoms used for the decomposition of the signal. Each atom is then associated with a scale and with a delay value.

The usual algorithms performing the decomposition of signals often have a mainly mathematical sense or a very generic physical sense like the presence of a frequency in the case of the use of the Fourier transform. In the large majority of cases, the relevant information after preprocessing is still presented in a distributed manner. One consequence is that the coding performed is then not very sparse. The algorithm used for the recognition phase will have a lot of work to do because of the poor effectiveness of the preprocessing.

Experience from greatly studied fields, such as speech processing, shows the extent to which the specialization of the preprocessing to the problem concerned improves performance.

The works of E. C. Smith and M. S. Lewicki presented in the articles *Efficient coding of time-relative structure using spikes*, Neural Computation, Vol. 17, p. 19-45, 2005 and *Efficient auditory coding*, Nature, Vol. 439, No. 23, p. 978-982, 2006, deal with the case of speech processing. Rather than use an a priori defined kernel base, the solution proposes to determine the relevant kernels for the coding by a learning mechanism. The learning of the kernels relies on a learning base containing signals specific to the source, such as ambient sounds, animal or human vocalizations or a mixture of the two. Following this learning phase, the sounds can be decomposed into discrete acoustic elements characteristic of the structure of the signals and optimal for its coding. The kernels obtained differ according to the type of signals that make up the learning base. For the case of learning signals consisting of ambient sounds and vocalizations, the kernels found correspond to the impulse responses of the filters of the cochlea in mammals. The coding produced is more efficient than the conventional codings such as those produced by Fourier transforms or in wavelets in that it produces a sparse code, also called "hollow code".

Some existing preprocessing methods make it possible to select a subset of kernels in a kernel base so that the coding is adapted, for example, to the instantaneous nature of the signal. However, in this case, the kernel base is defined a priori and the kernels are not adapted to the physical reality of the signal. The coding algorithm proposed by E. C. Smith and M. S. Lewicki makes it possible to adapt the kernels for the source but it is not applied to the field of shape recognition and it is not optimized for the processing of signals or data represented on several dimensions. Shape recognition applications, such as, for example, seismic signal analysis and writing recognition or, more generally, movement recognition require a multidimensional processing. Such is also the case, for example, for medical applications such as electrocardiogram ECG, electroencephalogram EEG or magnetoencephalogram MEG.

SUMMARY OF THE INVENTION

One aim of the invention is notably to overcome the above-mentioned drawbacks.

To this end, the subject of the invention is a method for recognizing shapes comprising at least one preprocessing mechanism that decomposes a source signal into basic components called atoms and a recognition mechanism that is based on the result of the decomposition performed by the preprocessing mechanism, said method being characterized in that the source signal comprises N dimensions, said mechanism comprising at least:
  a learning phase culminating in a set of signals called kernels and consisting of indexed samples, said kernels being adapted to minimize a cost function;
  a coding phase for decomposing the source signal into atoms, said atoms being generated by shifting of the kernels found during the learning phase, each of said atoms being associated with a decomposition coefficient.

According to one aspect of the invention, at the start of the learning phase, a step initializes the kernels by random white noise selections.

In one embodiment, the N dimensions of the source signal are, for example, processed independently of one another by the preprocessing mechanism.

In another embodiment, a number of dimensions of the source signal are processed jointly by the preprocessing mechanism.

During the learning phase, the kernels are adapted, for example, by minimizing the cost function on the basis of signal data representative of the source to be processed by using a stochastic gradient descent method.

During the learning phase, the kernels may be adapted by minimizing the cost function on the basis of signal data representative of the source to be processed by using the Levenberg-Marquardt algorithm, said algorithm being applied following the calculation of a mean Hessian for each of said kernels.

During the learning phase, the kernels are adapted by minimizing the cost function on the basis of signal data representative of the source to be processed by using the gradient descent by resilient propagation method.

The shapes to be recognized are used, for example, to identify cardiac anomalies.

The shapes to be recognized are, for example, representative of movements or gestures.

The shapes to be recognized that are representative of movements or gestures are, for example, handwritten characters or series of handwritten characters.

The shapes to be recognized are used, for example, to identify a type of cerebral activity.

The shapes to be recognized are used, for example, to identify the presence of molecules or of groups of molecules in a sample studied by mass spectrometry.

During the coding phase, the step for searching for better atoms used for the decomposition of the signal portion currently being processed applies, for example, a rotation to the kernels, each atom retained for the decomposition thus consisting of a kernel, a shift index and a rotation factor, said retained atoms being associated with a decomposition coefficient.

During the coding phase, the rotation factor of the kernels is, for example, a square matrix representing the rotation applied to each selected kernel, the elements of said matrix being determined during the coding phase of the method by taking a number of rotation hypotheses for each kernel and each instant in order to select the best rotation hypothesis.

The method processes, for example, a two-dimensional source signal and said signal and the kernels of the transform are represented by complex numbers, the real part of these complex numbers corresponding to the first dimension and the imaginary part corresponding to the second dimension. The decomposition coefficients are then complex so that their phase represents the rotation factor and make it possible to apply a rotation angle to the kernels.

The method processes, for example, three-dimensional signals and said signals and the kernels of the transform are represented by quaternions. The decomposition coefficients are then quaternions and make it possible to apply a 3D rotation to the kernels.

The coding phase implements, for example, a basis pursuit method.

The coding phase implements, for example, a matching pursuit method.

The matching pursuit method that can be used during the coding phase is, for example, of orthogonal type, the decomposition coefficients being updated after each selection of a new atom by projecting the signal to be processed onto the base consisting of the atoms already retained.

The coding phase for a signal currently being processed ends, for example, when the number of atoms selected reaches a maximum value.

The coding phase for a signal currently being processed ends, for example, when a chosen minimum relative value of the last decomposition coefficient relative to the greatest value of the other coefficients previously calculated is no longer assured.

The coding phase for a signal portion currently being processed ends, for example, when the energy of the remainder of the decomposition falls below a chosen threshold value from which the coding is considered effective.

Another subject of the invention is a shape recognition system that implementing the method, comprising at least:
- a sensor or an array of sensors producing as output one-dimensional or multidimensional signals;
- a preprocessing module implementing the method according to the invention and used to execute the learning and/or coding phases of said method;
- a recognition module used to perform analysis and/or detection and/or shape recognition functions;
- a result analysis module.

The shape recognition system comprises, for example, one or more communication modules making it possible to locate the other modules of the system on at least two remote physical equipment items and enabling them to exchange their results.

The shape recognition system comprises, for example, at least one storage module connected to the preprocessing module, the results of said preprocessing being able to be stored in the storage module and the storage module being able to be disconnected from the processing module to be connected to the recognition module located on a remote equipment item for the results of the preprocessing to be analyzed therein.

The notable advantage of the invention is being able to adapt the kernels used for the decomposition to the type of sources to be processed and thus be applicable in the context of different applications such as, for example, electrocardiogram or movement recognition. Another advantage of the invention is being able to process multidimensional signals and be applied with a reduced number of kernels by using the rotation management. The invention also proposes a kernel learning method that makes it possible to converge more rapidly toward the optimal solution than the existing method.

BRIEF DESCRIPTION OF THE DRAWINGS

Other features and advantages of the invention will become apparent from the following illustrative and nonlimiting description, given in light of the appended drawings in which.

DETAILED DESCRIPTION

Figure 1:
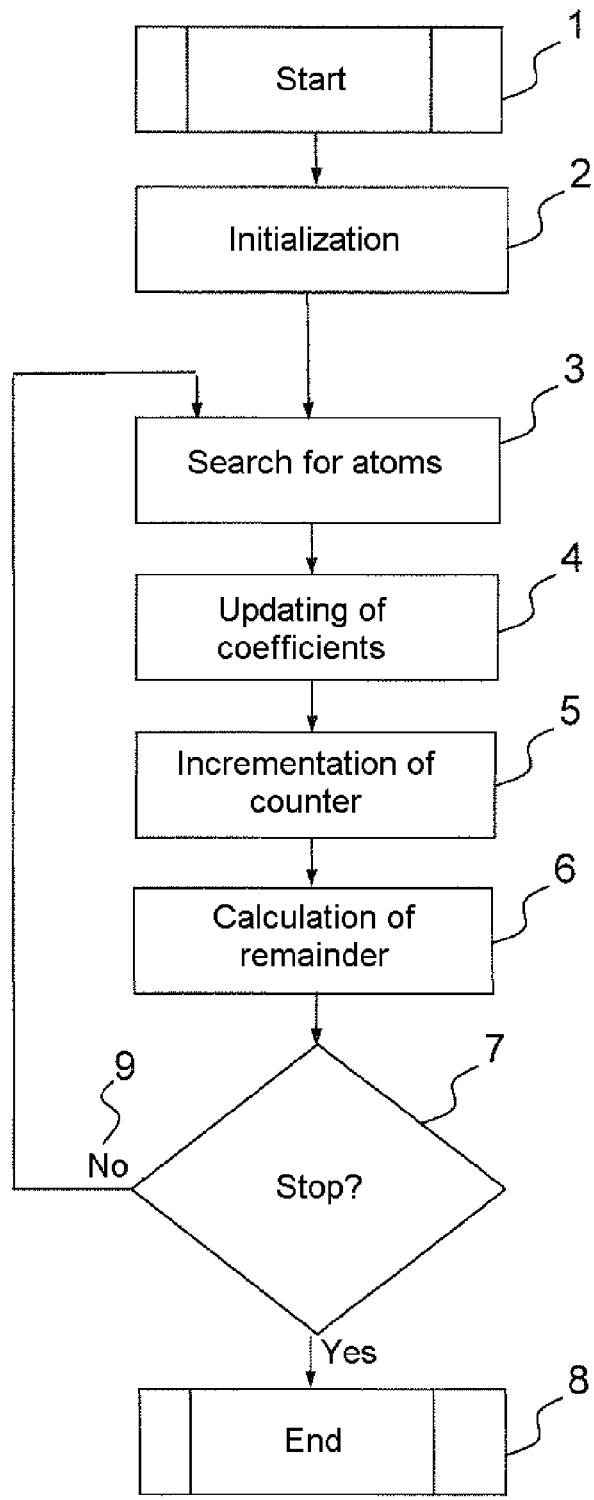
FIG. 1 illustrates the transform coding phase with kernels adapted to the method according to the invention.

Hereinafter in the description, an input to be processed, which will also be called source signal hereinafter in the document, refers notably to a vector of dimension N or else to an indexed collection of vectors of dimension N.

In the case where the source signal refers to a collection of samples of dimension N, the latter may consist, for example:
- of a series of time-indexed one-dimensional samples originating, for example, from a sampled sound source;
- of a series of one-dimensional samples spatially indexed by their position x and y originating, for example, from an image in gray levels;
- of a series of time-indexed multidimensional samples, originating, for example, from a multidimensional movement sensor (three-directional accelerometer) or an array of seismic sensors;
- of a series of spatially-indexed multidimensional samples originating, for example, from a color or hyperspectral image: the dimensions of the vector, that is to say the pixels, being the colors (Red, Green and Blue) or the frequency bands of the hyperspectral image, the indexing being done according to the position x and y of the pixel;
- of a series of space-time-indexed one-dimensional or multidimensional samples originating, for example, from a video with indexes x, y and t, or even a 4D virtual simulation (x, y, z and t);
- of a series of one-dimensional or multidimensional samples indexed by one or more variables that do not necessarily have any spatial or temporal meaning, for example originating from Fourier transforms applied to the various stations of a seismic array and thus producing a collection of multidimensional samples (one dimension for each station) indexed by the frequency.

A basic transformation of the signal consists in creating a new signal from the source signal by subtracting shift values from the indexing values. In the case of a time-indexed signal, these shift values correspond to the application of a delay. This delay may be negative which then advances the signal in time. In the case of an image indexed spatially as (x, y) or a 3D representation indexed as (x, y, z), these shift values correspond to a translation. For a video (x, y, t) or a 4D virtual simulation (x, y, z, t) the translation or delay term depending on the index concerned is used. In the case where the indexes are frequencies, the shift values correspond to frequency shifts.

Hereinafter in the description, in order to simplify the writing and unless otherwise specified, the source signal will be denoted s(t), like a multidimensional time signal. This way of writing is in no way limiting however, t in practice being able to be a set of indices, for example x and y in an image or (x, y, t) in a video and s being able to be one-dimensional. Similarly, we will employ the term "shift" to refer to any transformation of the signal based on the manipulation of the indices via shift values, thus including the particular cases of delay and translation. All the data associated with the source signal, such as the kernels and remainders, follow the same writing rule.

In order to illustrate the case where the source signal refers to a vector, mass spectrometry is a useful example. A result vector representing the mass spectrum then consists of several thousands of components, each corresponding to a mass-to-charge ratio of the molecules on which the measurements are conducted, also called channel.

The preprocessing method according to the invention comprises a coding phase and a learning phase.

Figure 2:
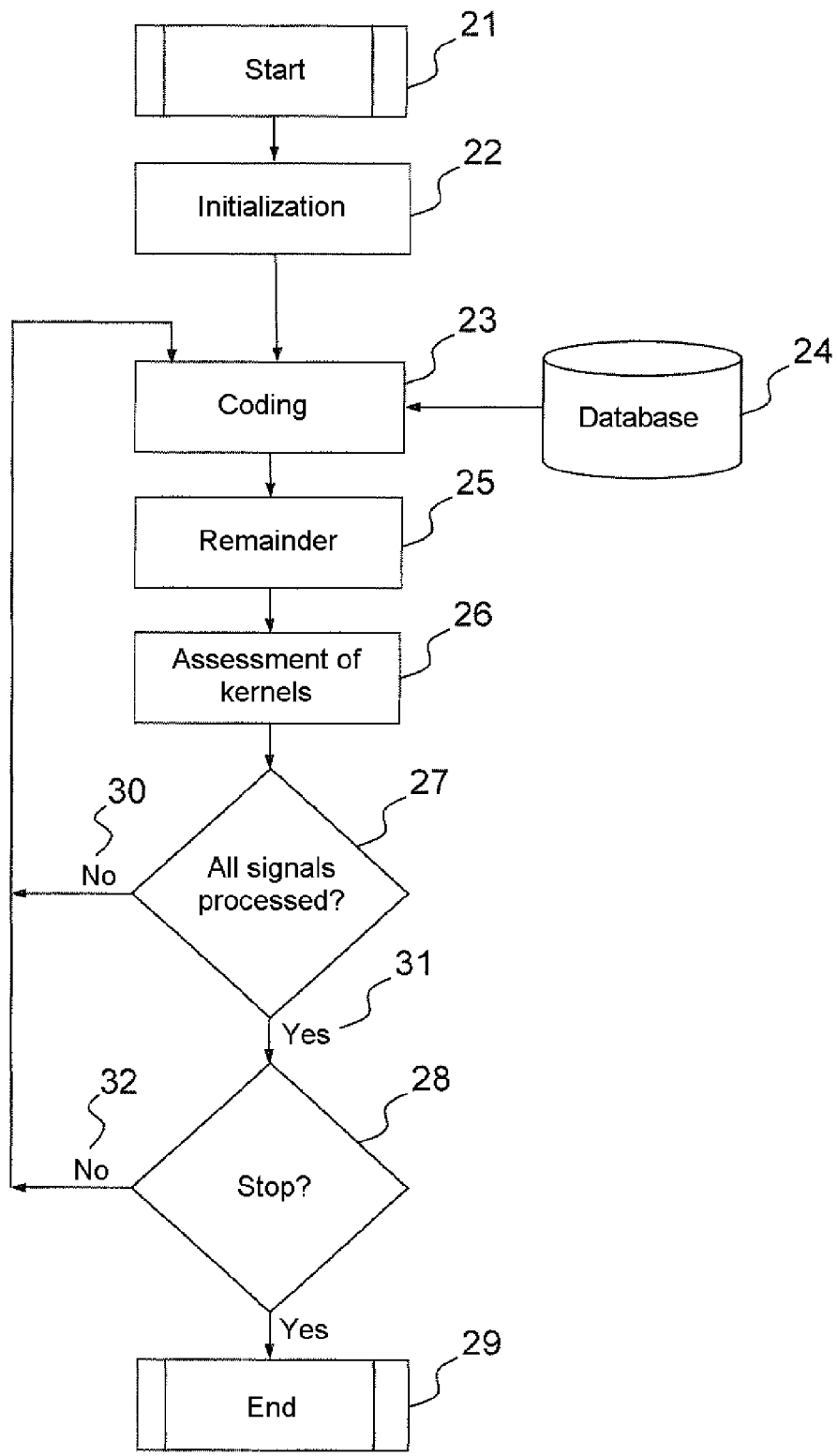
FIG. 2 illustrates the kernel learning phase of the method according to the invention.

The learning phase is used to adapt the kernels used for the coding of the source to be coded. The duly found kernels are then used during the coding phase. FIGS. 1 and 2 illustrate two exemplary implementations of the two phases of the method according to the invention. The method according to the invention can be used in the context of various shape recognition applications. For example, the method can be implemented in the context of electrocardiogram analysis. In this case, the learning phase of the method will identify a few kernels used to decompose the cardiac pulse. Other possible applications within which the implementation of the method is useful are notably the recognition of seismic signals, the recognition of movements and the analysis of electroencephalograms and/or magnetoencephalograms, the aim of which is to identify the reaction of certain regions of the brain.

FIG. 1 shows an exemplary diagram illustrating the coding phase of the method according to the invention. The aim of this coding phase is to decompose a vector signal into basic vector components, these basic components being called atoms.

The method according to the invention makes it possible to process multidimensional information items represented in vector form, the dimensions of the vectors being able to be processed jointly. This is useful when the application for which the method is used relies on one or more sensors supplying multidimensional information. As an example, sensors linked to actions supply information that may be three-dimensional. In the case of biomedical sensors, their output data are represented with a large number of dimensions, for example twelve dimensions for electrocardiograms, several tens for electroencephalograms and several hundreds for magnetoencephalograms.

However, the joint processing of all the dimensions of the system input is not an obligation and a preprocessing module can work on a signal consisting of a subgroup of variables, that is to say a subgroup of dimensions. One limiting case is the situation where the preprocessing is done for each dimension (each group is of cardinal 1, there being as many groups as there are dimensions). There are then as many preprocessing modules as there are dimensions and each module processes a one-dimensional signal.

This way of using several modules implementing the method according to the invention on different source signals also makes it possible to apply the application in the case where there are several heterogeneous inputs. Such is the case, for example, with a speech recognition module which uses both a sound stream (time-indexed one-dimensional signal, with a sampling frequency of 16 kHz) and a video stream (red-green-blue three-dimensional signal indexed by the position in the image (x,y) and by time, with a sampling frequency of 25 Hz). The recognition system then uses, for example, a preprocessing module according to the invention to preprocess the audio stream, and a preprocessing module according to the invention to preprocess the video stream, the outputs of the two modules then being used for the discrimination.

This decomposition is performed through the use of a hollow decomposition technique, such as, for example, the pursuit methods such as for example the methods known as "Matching pursuit" and "Basis pursuit". The signal after decomposition takes the following form:

$$s(t) = \sum_{m=1}^{M} \sum_{i=1}^{I_m} \alpha_i^m \phi_m(t - \tau_i^m) + e(t) \qquad (5)$$

This corresponds to a particular case of the equation (4), restricted to the j indices such that $\beta_j$ is non-zero. The family of all the atoms $\{\psi_j(t)\}_j$ of the equation (4) here corresponds to the family $\{\{\phi_m(t-\tau)\}_\tau\}_m$ containing all the possible time shifts of each kernel. In (5), mapping relationships are established that simplify the writing of the equation (4) in this particular case. Thus, the values $I_m$, $\alpha_i^m$ and $\tau_i^m$ are established so that, for any index j of the equation (4) such that $\beta_j$ is non-zero, there are m, $I_m$, $i \leq I_m$, $\alpha_i^m$ and $\tau_i^m$ such that: $\psi_j(t) = \phi_m(t-\tau_i^m)$ and $\beta_j = \alpha_i^m$.

The atoms $\phi_m(t-\tau_i^m)$ used to decompose the signal have the same dimension as the source signal. Generically, the latter are generated by shifts of the kernels according to their index. In this example, the indices are time indices and the shifts correspond to delays.

For each of the M kernels used, $I_m$ time shifts of the kernel make it possible to generate $I_m$ atoms necessary for decomposition. The kernels are determined in the learning phase of the method according to the invention. This learning phase will be explained later in the description with the help of FIG. 2. The error term e(t) called remainder represents the portion of the signal that could not be decomposed by the atoms selected by the decomposition algorithm.

One method for executing the coding phase is to iteratively optimize the number of atoms used to decompose the signal. For this, an orthogonal matching pursuit type approach, an improvement on the conventional "matching pursuit" method, is applied. This iterative method successively retains the atoms that are most closely correlated to the remainder. This algorithm has good error-reducing and implementation flexibility properties. In the case of a base constructed from a few kernels duplicated at each instant as is the case for the transform with matching kernels, the calculations may be accelerated by using the non-cyclic convolution of the signal with the kernels and the use of the fast Fourier transform. This method can also be used for multiple indices (video image) via the multidimensional Fourier transform.

When the coding phase 1 is launched for a given portion of the signal to be processed, a first initialization step 2 is applied. This step 2 initializes the residual error to the value of the signal portion to be processed, namely:

$$e(t) = s(t) \qquad (6)$$

While this same step is being executed, the counter $I_m$ is initialized to zero for any value of m with $m \in [1 \ldots M]$. The coefficients $\alpha_i^m$ of the decomposition are also initialized to zero.

A step 3 for searching for the atoms to be retained for the decomposition of the signal is applied following the initialization step 2. For this, convolutions of the remainder e(t) with all the kernels $\phi_m(t)$ are executed. In the multidimensional case, the conventional scalar product between vectors at each instant is used. The calculations are then equivalent to aggregating results of the convolution of each dimension of e(t) with the associated dimension of $\phi_m(t)$. An atom is chosen by retaining the kernel $\phi_m(t)$ associated with a delay value $\tau_i^m$ that gives the greatest absolute value of the convolution product. In the case where $\phi_m(t)$ is normed, this value is then precisely the coefficient $\alpha_i^m$. This approach makes the distinction between similar signals on different directions. Thus, for a handwriting recognition application, a horizontal movement and a vertical movement will be associated, for example, with two distinct "movement" kernels. This approach is called an oriented approach.

A variant of this approach that can be qualified as non-oriented can be used to associate similar signals in different directions with one and the same kernel. Considering again the example of handwriting recognition, a vertical line and a horizontal line will be associated with one and the same "line" kernel, the kernel concerned having undergone a rotation for the association with a vertical or horizontal line. Compared to the oriented approach, each kernel undergoes a particular rotation when it is employed. The signal after decomposition is then expressed:

$$s(t) = \sum_{m=1}^{M} \sum_{i=1}^{I_m} \alpha_i^m R_i^m \phi_m(t - \tau_i^m) + e(t) \qquad (7)$$

$R_i^m$ being the matrix representing the rotation that the kernel $\phi_m$ undergoes in its $i^{th}$ use. This corresponds to a new particular case of the expression (4), restricted to the j indices such that $\beta_j$ is non-zero. The family of all the atoms $\{\psi_j(t)\}_j$ of the expression (4) here corresponds to the family $\{\{\{R.\phi_m(t-\tau)\}_R\}_\tau\}_m$ containing the results of the application of all the possible rotations and of all the possible time shifts to each kernel. Mapping relationships are in fact established in (7) which simplify the writing of (4) in this particular case. In practice, the values $I_m$, $\alpha_i^m$, $R_i^m$ and $\tau_i^m$ have been established such that, for any index j of (4) such that $\beta_j$ is non-zero, there is m, $I_m$, $i \leq I_m$, $\alpha_i^m$, $R_i^m$ and $\tau_i^m$ such that: $\psi_j(t) = R_i^m \phi_m(t-\tau_i^m)$ and $\beta_j = \alpha_i^m$.

The matrix $R_i^m$ is an additional element that has to be sought in the step 3 for searching for atoms. In the case where the non-oriented approach is used, an atom can be defined, for example, by a triplet of elements consisting of a kernel $\phi_m(t)$, a delay $\tau_i^m$ and a rotation matrix $R_i^m$ that can be qualified as rotation factor.

Various methods can be implemented in order to determine the matrix $R_i^m$.

A first method is to test different rotations for each kernel and each instant. The number of atoms constructed from a single kernel increases and the search takes a long time.

A second method suited to two-dimensional signals can be used to reduce this complexity. The two-dimensional signals are represented by complex numbers and the coding phase may exploit this format. Instead of having signals and real vector kernels with two dimensions, consideration is focused more on complex one-dimensional signals and kernels. The real part of these complex numbers corresponds to the dimension 1 and the imaginary part to the dimension 2. The decomposition coefficients in turn become complex. The norms of these coefficients correspond to the $\alpha_i^m$ and the phases to the rotation angles of the matrices $R_i^m$. The advantage of this method is two-fold. On the one hand, there is no need to sample the rotation angles to be tested: the algorithm gives a continuous phase. On the other hand, the calculation power required is only doubled relative to the oriented approach. This doubling corresponds to the calculation of the correlations between real and imaginary parts of the signals, the correlations between real parts or between imaginary parts being equivalent to the dimension-by-dimension correlations in the oriented case. The gain is therefore significant compared to exploring the various possible rotations.

A third possible method is suited to three-dimensional signals and uses the principle of the preceding method, employing quaternions instead of the complex numbers.

The search for the best kernels can also be refined by introducing a mechanism for managing the time expansion of the kernels. In the case of gesture recognition, this expansion corresponds simply to the fact that the gestures can be executed more or less rapidly depending on the individuals, and even by the same person depending on the context. In a way that is similar to the non-oriented approach, this compensation mechanism increases the number of atoms that are fabricated from a kernel, via the introduction of a scale factor. The decomposed signal is in this case expressed:

$$s(t) = \sum_{m=1}^{M} \sum_{i=1}^{I_m} \frac{\alpha_i^m}{\sqrt{a_i^m}} \phi_m\left(\frac{t - \tau_i^m}{a_i^m}\right) + e(t) \quad (8)$$

$\alpha_i^m$ being the expansion factor of the kernel $\phi_m$ for its $i^{th}$ use and taking a positive real value. This corresponds to a new particular case of the equation (4), restricted to the j indices such that $\beta_j$ is non-zero. The family of all the atoms $\{\psi_j(t)\}_j$ of the equation (4) here corresponds to the family $$\left\{\left\{\left\{\frac{1}{\sqrt{a}} \phi_m\left(\frac{t-\tau}{a}\right)\right\}_a\right\}_\tau\right\}_m$$

which contains the results of the application of all the possible expansions and of all the possible time shifts to each kernel. Mapping relationships are established in the expression (8) that simplify the writing of the expression (4) in this particular case. In practice, the values $I_m$, $\alpha_i^m$, $\alpha_i^m$ and $\tau_i^m$ are established so that, for any index j of (4) such that $\beta_j$ is non-zero, there are m, $I_m$, $i \leq I_m$, $\alpha_i^m$, $\alpha_i^m$ and $\tau_i^m$, such that:

$$\Psi_j(t) = \frac{1}{\sqrt{a_i^m}} \phi_m\left(\frac{t - \tau_i^m}{a_i^m}\right) \text{ and } \beta_j = \alpha_i^m.$$

This decomposition involves testing a number of expansion factors each time, as for the rotation. The expansion can be used in the case of a vector signal, and with the oriented or non-oriented approach.

A step 4 for updating the coefficients $\alpha_i^m$ is applied following the step for searching for the atoms 3. The coefficients $\alpha_i^m$ associated with each of the atoms already selected are updated.

An orthogonal projection of the signal onto the base consisting of the atoms already selected is performed. For this, the calculation of the coefficients can be done in two distinct ways.

A first method is based on the clarification of the orthogonal projector on the space generated by the selected atoms. This method is complex to implement and leads to significant processing times. Determining the projector entails calculating the pseudo-inverse matrix of a large matrix. The calculation of the matrix of the projector is performed in this case after each selection of a new atom and iteratively by the Greville algorithm.

A second method proposed by Y. Pati and R. Rezaiifar and P. Krishnaprasad in the article *Orthogonal Matching Pursuit: Recursive Function Approximation with Applications to Wavelet Decomposition*, Proceedings of the 27th Annual Asilomar Conference on Signals, Systems, and Computers, November 1993, uses the orthogonal projection of the atom selected in the current iteration on the subspace consisting of the atoms selected up to the preceding iteration. Thus, the calculation of the projection on the space consisting of the L atoms resumes with an updating of the L−1 coefficients $\alpha_i^m$ of the atoms previously calculated and with the calculation of the new coefficient. This second method allows for a reduction in the calculation time by a factor of 5 to 20 compared to the time needed to implement the Greville algorithm according to the size of the signals and of the atoms.

It is also possible to use the conventional matching pursuit method without orthogonal projection. The calculation time of an orthogonal matching pursuit method is longer than the conventional approach but the results obtained are of much greater interest: for a given group of atoms, the orthogonal version guarantees the best possible reconstruction, which is not the case with the conventional version. In practice, when the atoms retained are not orthogonal, there are interactions between them. The correlation between the remainder e(t) and the atom is then not exactly the ideal value $\alpha_i^m$, and the reconstruction is not optimal. The orthogonalization makes it possible, when a new atom is added, to correct the old coefficients found to incorporate the interactions between the atoms previously selected and the new one.

The step 5 following the updating of the coefficients 4 increments the counter $I_m$.

The remainder is then recalculated 6. In the conventional case this involves subtracting the contribution of the signal corresponding to the last atom selected from the current value of the latter and from the value of the associated coefficient $\alpha_i^m$. In the case of orthogonal matching pursuit, the current reconstructed signal is recalculated based on the $\alpha_i^m$ current ones and is subtracted from the initial signal.

After the coefficients have been updated, a stop criterion 7 is used to decide whether the execution of the coding phase for the portion of the signal currently being processed should be stopped or continue. If the decision is to stop, the coding ends 8. Otherwise, the search for atoms and associated coefficients continues 9 and the preceding steps are applied from the step for searching for atoms 3.

The stop criterion may be, for example, a maximum number of atoms to be selected beyond which the coding phase stops.

Another example of a possible criterion is to define a minimum relative value of the last coefficient $\alpha_i^m$ relative to the greatest value of the other coefficients calculated previously, making it possible to decide to stop the coding phase for the signal portion currently being processed.

Another exemplary criterion that can be put in place is to define a threshold value for the remainder below which the coding phase is stopped for the signal portion currently being processed.

FIG. 2 shows an exemplary diagram illustrating the learning phase of the method according to the invention. As introduced previously, the processing method according to the invention comprises a coding phase and a learning phase.

The aim of the learning phase is to find the kernels for the decomposition to use the fewest possible atoms while minimizing the residual error. This phase can be used at different moments in the execution of the method depending on the application concerned. For example, the learning phase may be executed just once before the coding phase is triggered. A regular learning can also be implemented, with a decision-taking trend over time thus being taken into account. Finally, it is possible to implement an online learning. The latter case of use is particularly useful in the context of systems that evolve over time and consequently require constant learning. One implementation of the online learning in the context, for example, of a writing recognition application, is that, when the user notices that the recognition system is mistaken in its decision and corrects it, a relearning of the kernels is triggered at that instant.

After the execution of the learning phase has been triggered 21, a first step 22 initializes the kernels $\phi_m$, for example by random selections according to a white noise, followed by a normalization. Another possible solution would be to start from a predefined base used conventionally for the target application. The learning then corresponds to a specialization of the base. Finally, it would also be possible to start from both, that is to say, having a priori initialized certain kernels through appraisal and initialized additional kernels with a white noise.

A database 24 containing a set of learning signals is used to adapt the value of the kernels. For this, the coding 23 of one of these learning signals, that is to say its decomposition, is performed by using, for example, the method described previously with the help of FIG. 1. The coding is first of all done with the kernels $\phi_m$ initialized in the preceding step 22. As indicated previously, the result of the coding is a set of n_uplets. Each n-uplet at least consists of the triplet (m, $\alpha_i^m$, $\tau_i^m$) corresponding to the first decomposition described in the expression (5).

According to the decomposition variants, it may also contain a rotation matrix $R_i^m$ as in the expression (6) and/or an expansion coefficient $\alpha_i^m$ as in the expression (7), or, more generally, any additional transformation parameters to be applied to the kernel to fabricate the atom. Since the process is iterative, the coding will then be performed with the last available kernels.

The benefit of the coding step is to be able to test the effectiveness of the coding on the signals from the learning base when the current kernels are used. This effectiveness is tested, for example, by checking the value of the remainder e(t) 26 after coding.

Based on the estimation of the remainder 25, the kernels are adapted 26. A conventional method that can be used to adapt the kernels of the transform uses the gradient descent method. The aim of this method is to determine the kernels $\phi_m$ but minimize a cost function. A cost function corresponds to a mathematical application with real value that can be used to assess the performance of a parameterized model, according to a certain criterion. Thus, by minimizing the cost function, the parameters of the best model are determined. The minimum is usually 0. Here, the parameters are the kernels and the criterion will reflect the adequacy between the observed signals and the hypothesis that they are formed from a few kernels. In other words, the cost function represents the capacity of the kernels to correctly reconstruct the signals from the database while guaranteeing a sparse decomposition of the source signal. The cost function is, for example, the opposite of the logarithm of the likelihood function of the signal conditionally at the roots of kernels, or $-\log[P(s|\Phi)]$ with $\Phi$ representing all the kernels. In the case of a Gaussian hypothesis concerning the noise and a very hollow code, Smith and Lewicki have shown that this log-likelihood could be approximated in the one-dimensional case by:

$$-\log P(s|\Phi) \approx \frac{1}{2\sigma_e}\left(s(t) - \sum_{m=1}^{M}\sum_{i=1}^{I_m} \alpha_i^m \phi_m(t-\tau_i^m)\right)^2 = \frac{1}{2\sigma_e}e(t)^2$$

Given these hypotheses, the opposite of the log-likelihood of the signal conditionally at the roots of kernels is, to within a multiplying factor, similar to the mean square error which is another conventional cost function in learning.

This function is minimized by adapting the kernels by a value proportional to the gradient of the function.

The convergence of this search algorithm can be improved by using the Levenberg-Marquardt algorithm known to those skilled in the art, instead of a conventional stochastic gradient descent. In principle, the Levenberg-Marquardt algorithm involves an approximation of the Hessian of the function to be optimized. The Hessian of a function is the square matrix of the second derivatives of said function. In the present case, the function is the cost function and the derivations are made relative to each sample of each kernel. In order to reduce the complexity of the calculations, the Levenberg-Marquardt algorithm simplifies the Hessian to obtain a diagonal matrix. This means that the crossed derivatives of the matrix are disregarded. An additional approximation is made: an average value for each kernel is considered, that is to say that the second derivative will be identical for all the samples of one and same kernel and will be scored as the second derivative relative to the kernel.

If the atoms used that derive from one and the same kernel are totally differentiated, that is to say that the deviations between two successive delays $\tau_i^m$ are greater than the duration of the kernel $T_m$, the second derivatives of the cost function used here are simply expressed:

$$-\frac{\partial^2}{\partial \phi_m^2} \log P(s \mid \Phi) = \frac{1}{\sigma_e} \sum_{i=1}^{l_m} \alpha_i^{m2} \quad (9)$$

Since the total differentiation of the atoms derived from one and the same kernel is not always checked, the Hessian is then underestimated, generating a local pitch that is too great and therefore instabilities during the learning.

So as to identify all the overlap situations, the shifts $\tau_i^m$ are sorted such that $\tau_1^m < \tau_2^m < \tau_3^m \leq \ldots \leq \tau_i^m < \tau_{i+1}^m < \ldots < \tau_{Im}^m$. Thus, all the overlap situations can be identified by usingby using a set $J_m$ defined below:

$$J_m = \{i \in [1 \ldots I_m - 1] \mid \tau_{i+1}^m - \tau_i^m < T_m\} \quad (10)$$

The crossed derivatives are then non-zero for all the kernels that have a non-empty set $J_m$. So as to take account of the overlap between atoms derived from one and the same kernel resulting in a non-uniformity in the second derivatives of each kernel, the Hessian is made uniform by an overestimation that is expressed, for example, as follows:

$$-\frac{\partial^2}{\partial \phi_m^2} \log P(s \mid \Phi) = \quad (11)$$

$$\frac{1}{\sigma_e}\left[\sum_{i=1}^{l_m} \alpha_i^{m2} + \sum_{j \in J_m} 2\frac{T_m - (\tau_{j+1}^m - \tau_j^m)}{T_m} \cdot |\alpha_j^m \cdot \alpha_{j+1}^m|\right]$$

Although it does tend to overestimate the Hessian, the equation (10) has advantageous limiting properties. If the deviation between two consecutive uses of the kernel is always greater than or equal to $T_m$, the formula (8) will be restored. If the overlap is very small, the duplicates produced have little influence on the Hessian. Finally, if the contribution of a kernel at a given instant is artificially split into several contributions with amplitudes of the same sign, the Hessian will be strictly the same by usingby using the duplicates produced weighted by $T_m/T_m = 1$.

The kernels are then adapted iteratively 26 by using the following final formula:

$$\phi_m^{k+1}(t) \big|_{t=[0 \ldots T_m]} = \phi_m^k(t)\big|_{t=[0 \ldots T_m]} + \quad (12)$$

$$\frac{\sum_{i=1}^{l_m} \alpha_i^m \left[ s(t) - \sum_{m=1}^{M} \sum_{i=1}^{l_m} \alpha_i^m \phi_m^k(t - \tau_i^m) \right]_{t=[\tau_i^m \ldots \tau_i^m + T_m]}}{\lambda + \sum_{i=1}^{l_m} \alpha_i^{m2} + \sum_{j \in J_m} 2\frac{T_m - (\tau_{j+1}^m - \tau_j^m)}{T_m} \cdot |\alpha_j^m \cdot \alpha_{j+1}^m|}$$

$\lambda$, being the regulating term of the Levenberg-Marquardt algorithm, and the coefficients $\alpha_i^m$ having been determined during the coding step 23.

The robustness of the learning phase may be improved using the RProp technique, more commonly known as "resilient propagation" method. This is similar to gradient descent but the gradient is no longer used as such: only its sign is taken into account together with a fixed pitch value. The instability phenomena due to widely overestimated gradients because of the noise are then avoided.

Following the kernel assessment step 26, a check is carried out to ensure that all the signals of the learning base have been processed 27. If not 30, the coding 23, remainder test 25 and kernel assessment 26 steps are applied to another learning signal from the base. If all the signals have been processed 31, a stop criterion is used to decide to end the learning phase 29 or else to reiterate the calculations 32 on all the signals of the learning base. This stop criterion is, for example, a threshold value of the average of the norm of the remainder below which it is considered that the kernels found allow for a sufficiently effective coding.

Figure 3:
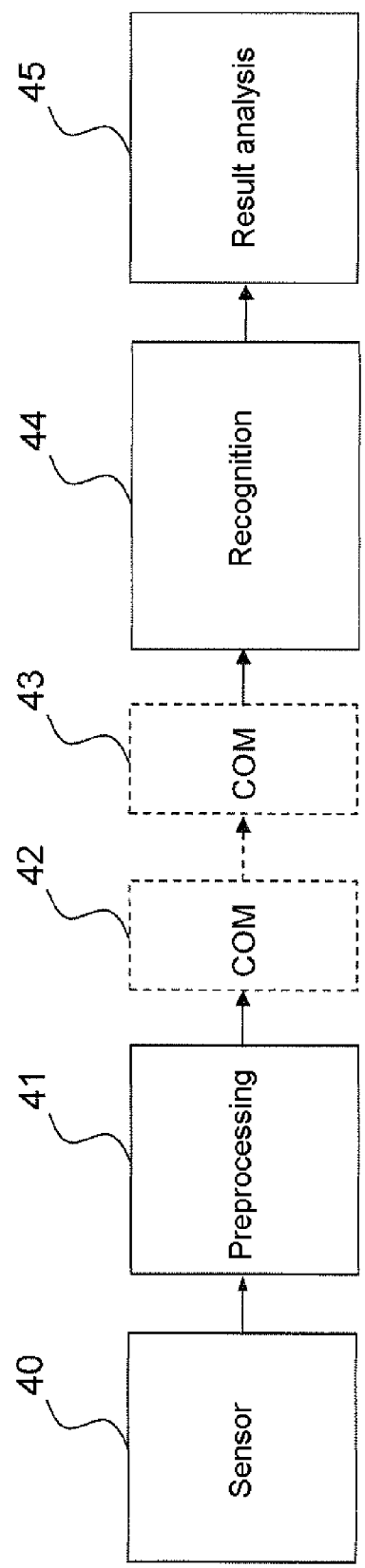
FIG. 3 shows an exemplary recognition device implementing the method according to the invention.

FIG. 3 shows an exemplary recognition system that implements the method. The system notably comprises a sensor or an array of sensors 40 producing as outputs one-dimensional or multidimensional data or signals. It also comprises a preprocessing module 41 implementing the method according to the invention and used to execute the learning and coding phases of the method. The kernels used by the preprocessing module are learned from a data or signal base specific to the target application.

The data or the signals decomposed by the preprocessing module are then analyzed by a recognition module 44. This module is used to perform shape analysis and/or detection and/or recognition functions. The possible parameters of the recognition module are learned, for example, from a base of examples associating classes with the coding resulting from the method on data or signals.

The result of the recognition 44 is then transmitted to a result analysis module 45, making it possible, for example, to display these results or trigger an alarm according to the event or events detected by the recognition module 44.

The system may also comprise one or more communication modules 42, 43 for performing the various functions of the system on remote physical equipment items. For example, a communication module 42 can transmit the results of the preprocessing, notably the coefficients associated with the atoms retained for the decomposition of the signals or data to be processed, to a remote equipment item comprising a communication module 43 for receiving these coefficients and processing them 44, 45. In this example, the coding 41 is done close to the sensor 40, but the recognition is done elsewhere to be able, for example, to have greater calculation power or more memory. Communication modules 42, 43 may be placed at other points in the processing chain, such as, for example, between the recognition module 44 and the result analysis module 44, 45.

A variant of the system may, for example, use a storage module for storing the results of the preprocessing 41. In this example, a first equipment item comprising the sensors 40 and the preprocessing module 41 will be able to write the results of the preprocessing into a storage module connected to the equipment item. The storage module can then be connected to an equipment item performing the recognition 44 and the result analysis 45, the latter equipment item being remote from the former.

The invention claimed is:

1. A method for recognizing shapes, said method comprising:
   at least one preprocessing step, performed by a preprocessing module, decomposing a source signal into first atoms, the source signal comprising N dimensions; and
   a recognition step, performed by a recognition module, based on the decomposition of the source signal performed by the preprocessing step, processing a number of the N dimensions of the source signal to recognize shapes in the source signal, the at least one preprocessing step comprising:
      a learning step determining a set of kernels comprising indexed samples, said kernels configured to minimize a cost function corresponding to the opposite of the logarithm of a likelihood function of a signal conditionally to all the kernels; and
      a coding step decomposing the source signal into second atoms by shifting and rotating the kernels determined in the learning step, such that each second atom comprises a kernel, a shift index, and a rotation factor, and is associated with a decomposition coefficient, wherein the number of second atoms is less than the number of first atoms,
      wherein the rotation factor of the kernels is a square matrix representing the rotation applied to each selected kernel, elements of said square matrix being determined during the coding step by taking a number of rotation hypotheses for each kernel and each instant to select an optimal rotation hypothesis.

2. The method as claimed in claim 1, wherein the learning step further comprises initializing the kernels by random white noise selections.

3. The method as claimed in claim 1, wherein the learning step comprises adapting the kernels by minimizing the cost function on the basis of signal data representative of the source signal to be processed by using a stochastic gradient descent method.

4. The method as claimed in claim 1, wherein the learning step comprises adapting the kernels by minimizing the cost function on the basis of signal data representative of the source signal to be processed by using the Levenberg-Marquardt algorithm, said Levenberg-Marquardt algorithm being applied following calculation of a mean Hessian for each of said kernels.

5. The method as claimed in claim 1, wherein the learning step comprises adapting the kernels by minimizing the cost function on the basis of signal data representative of the source signal to be processed by using the gradient descent by resilient propagation method.

6. The method as claimed in claim 1, wherein the shapes to be recognized are handwritten characters or series of handwritten characters.

7. The method as claimed in claim 1, wherein the source signal is a two-dimensional source signal, and the source signal and the kernels are represented by complex numbers, the real part of the complex numbers corresponding to the first dimension and the imaginary part corresponding to the second dimension, the decomposition coefficients also being complex so that their phase represents the rotation factor and enabling application of a rotation angle to the kernels.

8. The method as claimed in claim 1, wherein the source signal is a three-dimensional source signal and the three-dimensional source signal and the kernels are represented by quaternions, the decomposition coefficients also being quaternions and enable application of a 3D rotation to the kernels.

9. The method as claimed in claim 6, wherein the coding step implements a basis pursuit method.

10. The method as claimed in claim 1, wherein the coding step implements a matching pursuit method.

11. A shape recognition system, comprising:
    a sensor or an array of sensors outputting one-dimensional or multidimensional signals;
    a preprocessing module configured to:
       decompose a source signal into first atoms, the source signal comprising N dimensions,
       determine a set of kernels comprising indexed samples, said kernels configured to minimize a cost function corresponding to the opposite of the logarithm of likelihood function of a signal conditionally to all the kernels, and
       decompose the source signal into second atoms by shifting and rotating the kernels, such that each second atom comprises a kernel, a shift index, and a rotation factor, and is associated with a decomposition coefficient,
          wherein the rotation factor of the kernels is a square matrix representing the rotation applied to each selected kernel, elements of said square matrix being determined by taking a number of rotation hypotheses for each kernel and each instant to select an optimal rotation hypothesis;
    a recognition module configured to, based on the decomposition of the source signal, process a number of the N dimensions of the source signal to recognize shapes in the source signal; and
    a result analysis module.

12. The shape recognition system as claimed in claim 11, further comprising one or more communication modules configured to locate other modules of the system on at least two remote physical equipment items and enabling the other modules of the system to exchange results of the shape recognition.

13. The shape recognition system as claimed in claim 11, further comprising at least one storage module connected to the preprocessing module, the at least one storage module being configured to store results of said preprocessing module, and to be disconnected from the preprocessing module and connected to the recognition module located on a remote equipment item, such that the results of the preprocessing module are analyzed in the recognition module.

* * * * *

UNITED STATES PATENT AND TRADEMARK OFFICE
CERTIFICATE OF CORRECTION

PATENT NO. : 8,693,765 B2  
APPLICATION NO. : 13/062220  
DATED : April 8, 2014  
INVENTOR(S) : Mercier et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 317 days.

Signed and Sealed this

Twenty-ninth Day of September, 2015

Michelle K. Lee
*Director of the United States Patent and Trademark Office*